(12) United States Patent
Saini et al.

(10) Patent No.: US 10,154,329 B2
(45) Date of Patent: Dec. 11, 2018

(54) AUDIO OUTPUT DEVICE AND AUDIO OUTPUT PORT OF COMPUTING DEVICE

(71) Applicant: GOOGLE LLC, Mountain View, CA (US)

(72) Inventors: Vivek Saini, Mountain View, CA (US); Lawrence Lam, San Jose, CA (US); Bernardo Núñez, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/465,301

(22) Filed: Mar. 21, 2017

(65) Prior Publication Data

US 2018/0279029 A1    Sep. 27, 2018

(51) Int. Cl.
| | |
|---|---|
| *H04R 1/02* | (2006.01) |
| *H04R 1/28* | (2006.01) |
| *G06F 1/16* | (2006.01) |
| *E05D 11/00* | (2006.01) |
| *E05D 7/00* | (2006.01) |

(52) U.S. Cl.
CPC ............... *H04R 1/028* (2013.01); *E05D 7/00* (2013.01); *E05D 11/0054* (2013.01); *G06F 1/169* (2013.01); *G06F 1/1616* (2013.01); *G06F 1/1637* (2013.01); *G06F 1/1656* (2013.01); *G06F 1/1681* (2013.01); *G06F 1/1688* (2013.01); *H04R 1/288* (2013.01); *E05Y 2900/606* (2013.01); *H04R 2499/11* (2013.01)

(58) Field of Classification Search
CPC ................ H04R 1/028; H04R 2499/15; H04R 2499/11; H04R 1/02
USPC ........................................ 381/395, 160, 333
See application file for complete search history.

(56) References Cited

U.S. PATENT DOCUMENTS

| | | | |
|---|---|---|---|
| 5,917,695 A | * | 6/1999 | Youn ................... G06F 1/1616 345/905 |
| 6,697,495 B1 | | 2/2004 | Youn |
| 6,771,494 B2 | | 8/2004 | Shimano |
| 7,133,280 B2 | | 11/2006 | Love |
| 8,923,934 B2 | | 12/2014 | Kim et al. |
| 2007/0047192 A1 | | 3/2007 | Kobayashi et al. |
| 2009/0190295 A1 | | 7/2009 | Chin et al. |
| 2013/0170124 A1 | | 7/2013 | Pan et al. |

(Continued)

OTHER PUBLICATIONS

International Search Report and Written Opinion for Application No. PCT/US2017/059009, dated Feb. 16, 2018, 17 pages.

*Primary Examiner* — Alexander Jamal
(74) *Attorney, Agent, or Firm* — Brake Hughes Bellermann LLP

(57) ABSTRACT

A computing device may include an audio output device installed in a base housing. A front volume of the audio output device may be defined in part by an inner facing surface of a housing of the computing device, with an audio output port defined by an opening in the housing. In some computing devices, the opening defining the audio output port may also accommodate a hinge assembly rotatably coupling the housing to a display. A path from the audio output device to the audio output port may be defined in part by a support pad that guides sound out through the audio output port toward the user, and may also function as a support pad supporting the computing device on a work surface when operating in a tablet mode.

21 Claims, 14 Drawing Sheets

(56) References Cited

U.S. PATENT DOCUMENTS

2014/0369533 A1* 12/2014 Kim ..................... H04R 1/345
                                                        381/160
2018/0101193 A1*  4/2018 Tragatschnig .......... G06F 1/162

* cited by examiner

US 10,154,329 B2

AUDIO OUTPUT DEVICE AND AUDIO OUTPUT PORT OF COMPUTING DEVICE

FIELD

This relates, generally, to audio output ports in computing devices.

BACKGROUND

Computing devices may include, for example, laptop computers, convertible computers, tablet computers, mobile phones with smartphone capabilities, and other such devices. These types of computing devices may include various types of user interfaces providing for input and output of information, various types of interface ports, audio input and audio output components, and other such features. Some computing devices may include two housing assemblies rotatably coupled by a hinge. The housing assemblies may include, for example, a base housing rotatably coupled to a display housing by a hinge. Expansion in the field of computing devices drives a need for reduction in the size of components, and more efficient placement of components.

SUMMARY

In one aspect, a computing device may include a base housing; a display housing coupled to the base housing by a hinge assembly; an audio output device installed in the base housing; and an opening formed in the base housing, a first portion of the opening defining an audio output port, and the hinge assembly being coupled to the base housing at a second portion of the opening.

In another aspect, a computing device may include a base housing including a first surface and a second surface opposite the first surface; at least one user interface device included on the base housing; an opening formed in the first surface of the base housing, the opening defining an audio output port; and an audio output device installed in the base housing, at a position corresponding to the opening in the base housing. The audio output device may include an enclosure bracket; an audio driver coupled to the enclosure bracket; a seal positioned between a first side of the enclosure bracket and the first surface of the base housing, the first side of the enclosure bracket, the first surface of the base housing, and the seal defining a front volume of the audio output device; an enclosure plate positioned at a second side of the enclosure bracket, the enclosure plate and the second side of the enclosure bracket defining a back volume of the audio output device; and an isolation pad positioned between the second side of the enclosure plate and the second surface of the base housing.

The details of one or more implementations are set forth in the accompanying drawings and the description below. Other features will be apparent from the description and drawings, and from the claims.

DETAILED DESCRIPTION

Figure 1A:
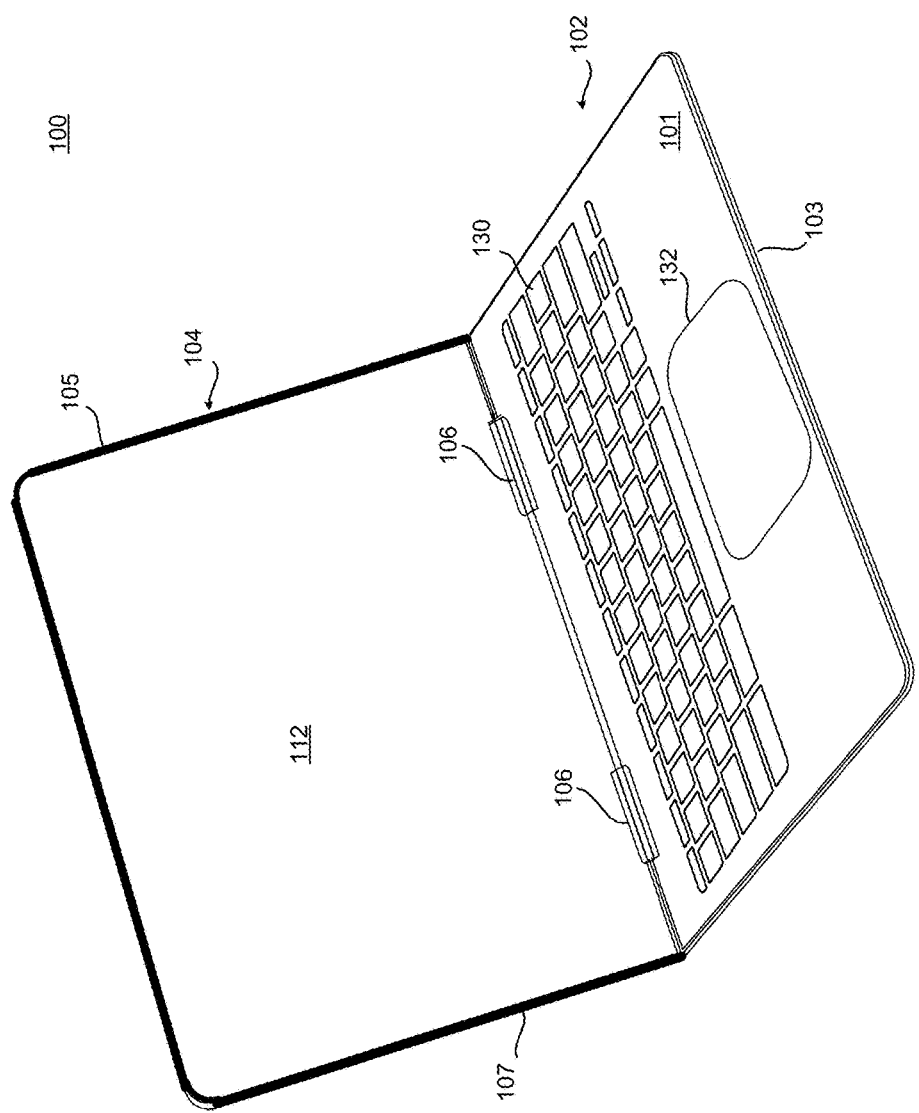
FIGS. 1A-1D illustrate an example computing device, in accordance with implementations described herein.
Figure 1B:
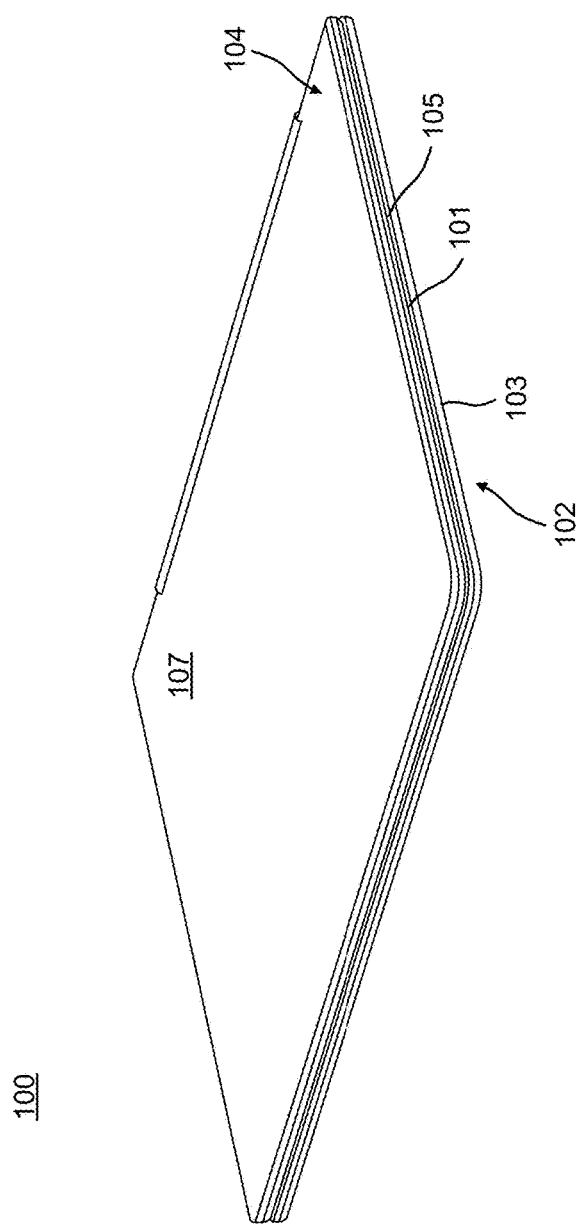
Figure 1C:
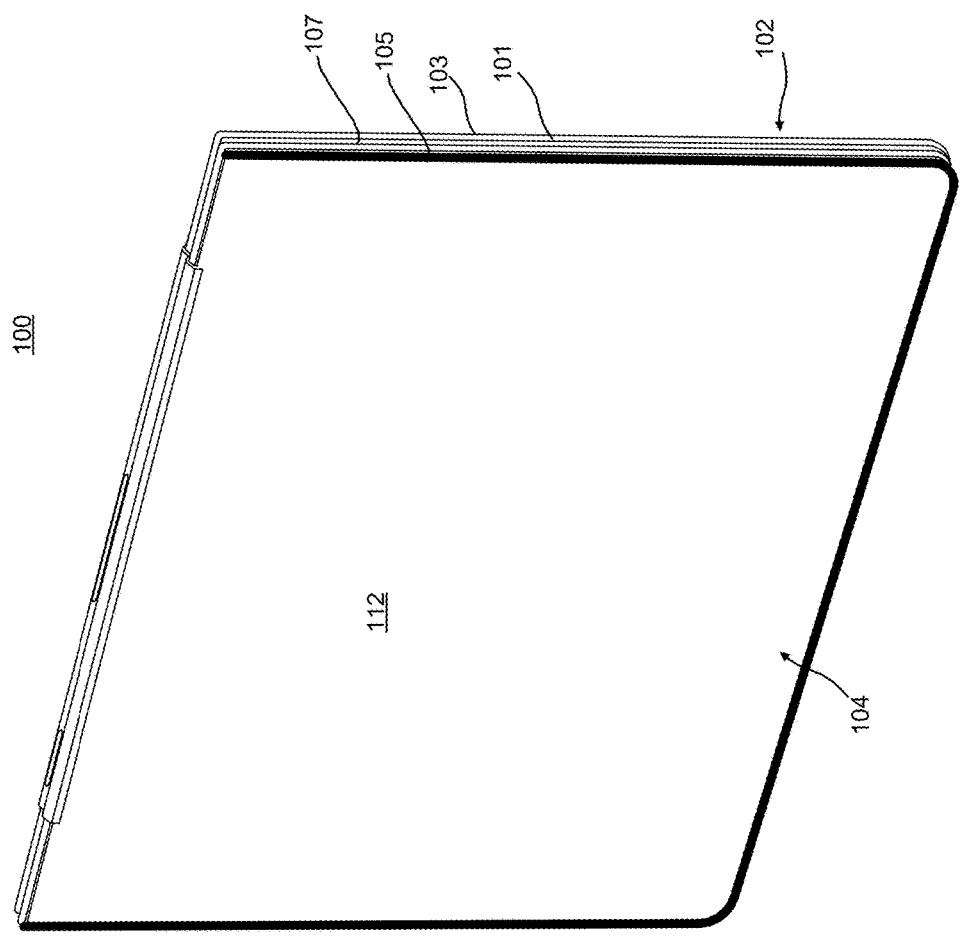
Figure 1D:
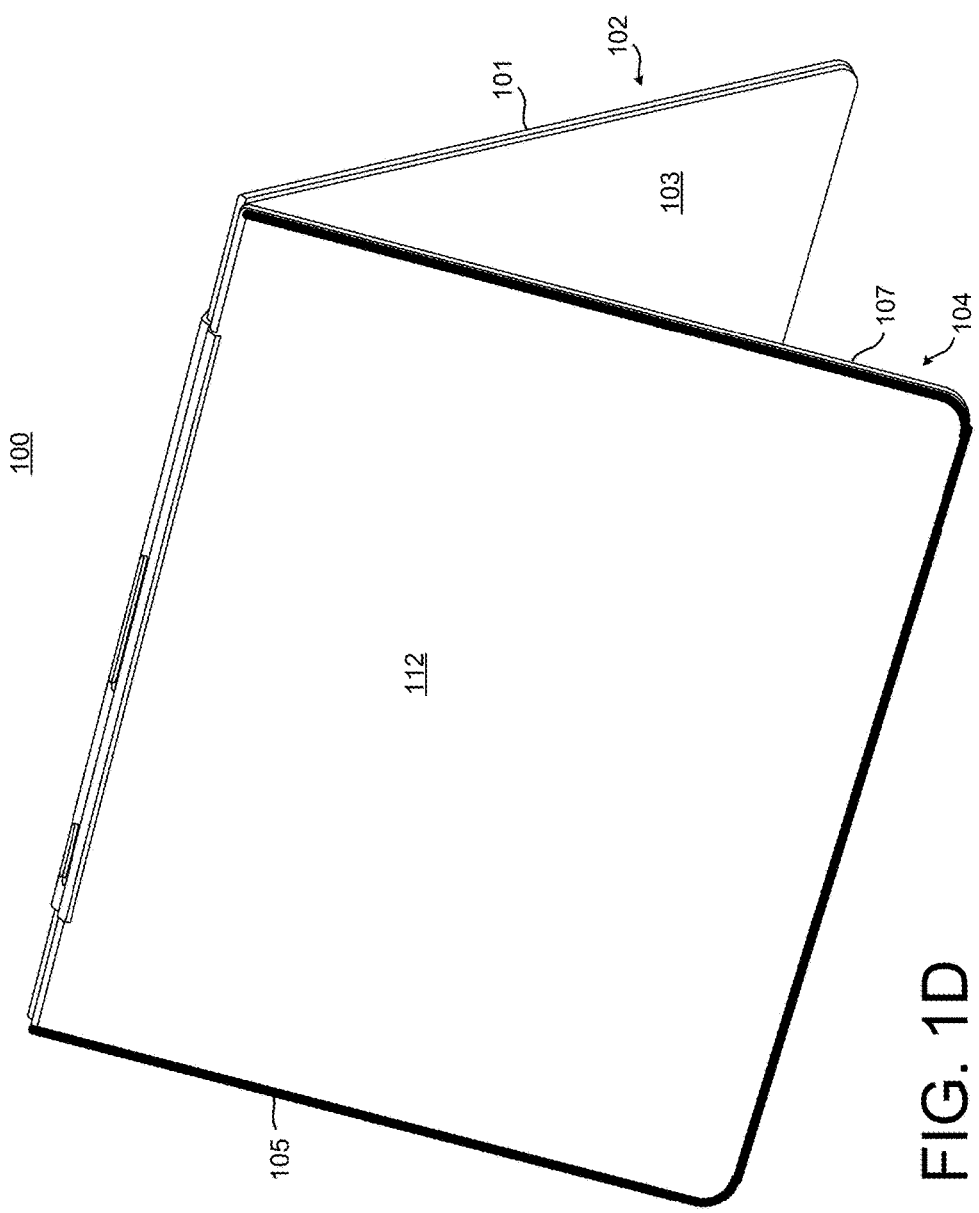

FIGS. 1A-1D illustrate an example portable computing device, in accordance with one example implementation. The example implementation shown in FIGS. 1A-1D illustrates a hybrid computing device 100, that may operate in a laptop mode or a notebook mode as shown in FIG. 1A, in a tablet mode as shown in FIG. 1C, and in an easel mode as shown in FIG. 1D. FIG. 1B illustrates the computing device 100 in a closed position. The example computing device 100 shown in FIGS. 1A-1D is just one example of a computing device, and the principles to be described herein may be applied to various other types of computing devices including an audio output port, or speaker port.

As shown in FIGS. 1A-1D, the computing device 100 may include a base housing 102 coupled to a display housing 104. The base housing 102 may include a lower surface 103 and an upper surface 101 that is opposite and generally parallel to the lower surface 103. Input devices, including, for example, a keyboard 130, a trackpad 132 and other such input devices may be provided on the upper surface 101 of the base housing 102. The base housing 102 may house various components of the computing device 100, such as, for example, a main logic board (MLB), central processing unit (CPU), a memory, a battery, input sensors, graphics cards, cooling mechanisms, structures supporting various external connections, and the like. The display housing 104 may include an outer surface 107 and a bezel surface 105, with a display 112 received in the display housing 104 and exposed for viewing by the user through an opening in the display housing 104 at the bezel surface 105.

The base housing 102 and display housing 104 may be coupled, for example, rotatably coupled, one or more hinge assemblies 106, allowing the display housing 104 to rotate about the hinge assemblies 106 and to move relative to the base housing 102. This rotatable coupling of the base housing 102 and the display housing 104 of the example computing device 100 may allow the computing device 100 to transition from the laptop mode shown in FIG. 1A, to the closed position shown in FIG. 1B, and to the tablet mode shown in FIG. 1C, and to the easel mode shown in FIG. 1D. One or more opening(s) 120, or port(s) 120, are formed in the base housing 102, at position(s) corresponding to the hinge assemblies 106, for example, at a peripheral edge portion of the base housing 102. In addition to accommodating the hinge assemblies 106, these openings 120 may define an audio output port 120, or speaker port 120, for sound generated by an audio output device 300 installed in the base housing 102. The example computing device 100 shown in FIGS. 1A-1D includes two hinge assemblies 106, simply for ease of discussion and illustration. However, similar principles may be applied to computing devices including more, or fewer, hinge assemblies, arranged in a variety of different manners, to couple a display housing to a base housing.

The example computing device 100 shown in FIGS. 1A-1D includes hinge assemblies 106 coupling the display housing 104 to the base housing 102. However, the principles to be described herein may be applied to various other types of computing devices that have an audio output device generating sound to be output through an audio output port, or speaker port, in areas other than an area corresponding to a hinge as described above, including, for example, computing devices such as a tablet computing device, having display capability included in its base housing, and without hinge assemblies coupling a separate display housing to the base housing.

Figure 2:
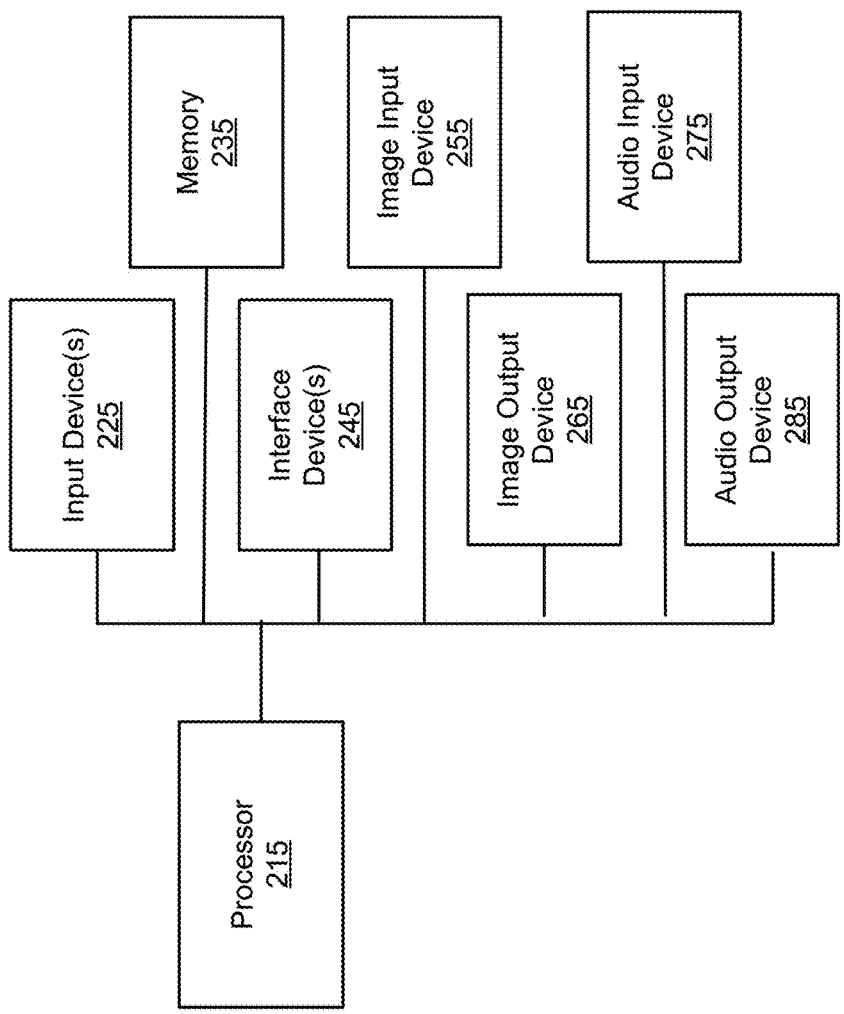
FIG. 2 is a block diagram of an example computing device, in accordance with implementations described herein.

As illustrated in the block diagram shown in FIG. 2, in some implementations, a computing device, such as the example computing device 100 shown in FIGS. 1A-1D, or other computing devices as noted above, may include, for example, a processor 215, one or more input device(s) 225, such as, for example, a keyboard, a trackpad, a touchscreen and the like, receiving external input to be processed by the processor 215, a memory 235, one or more interface device(s) 245 providing for communication with one or more external devices, an image input device 255 such as, for example, a camera, an image output device 265 such as, for example, a display, an audio input device 275 such as, for example, a microphone, and an audio output device 285 such as, for example, a speaker. The computing device may include more, or fewer components, and the block diagram shown in FIG. 2 illustrates just some components of the example computing device.

Figure 3A:
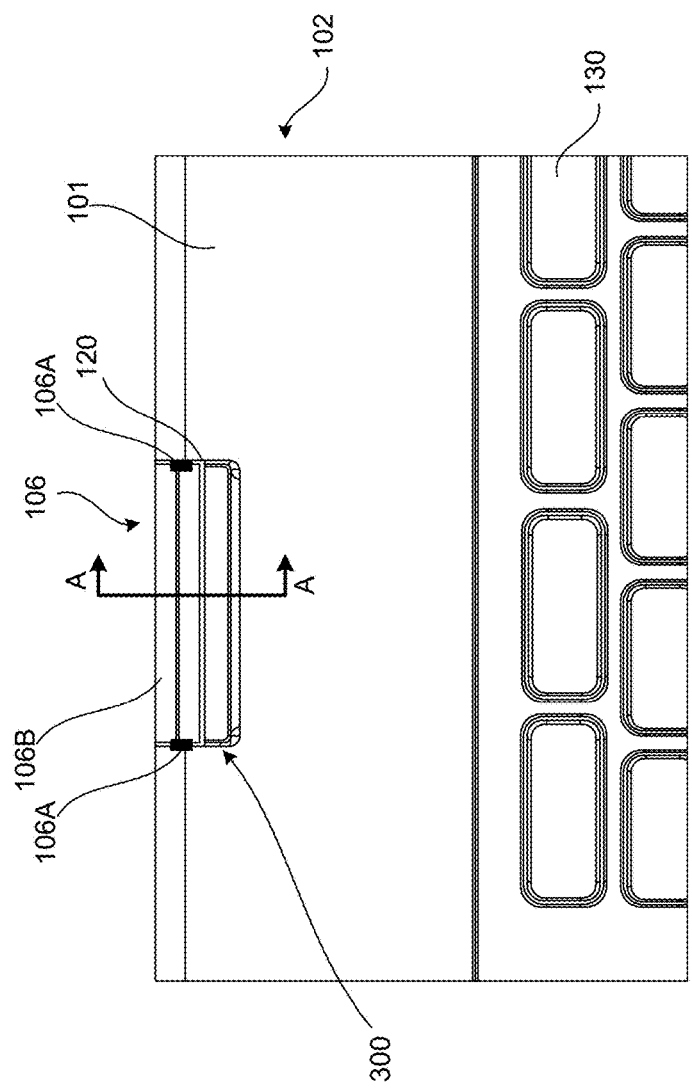
FIG. 3A is a partial top view of an example computing device, in accordance with implementations described herein.
Figure 3B:
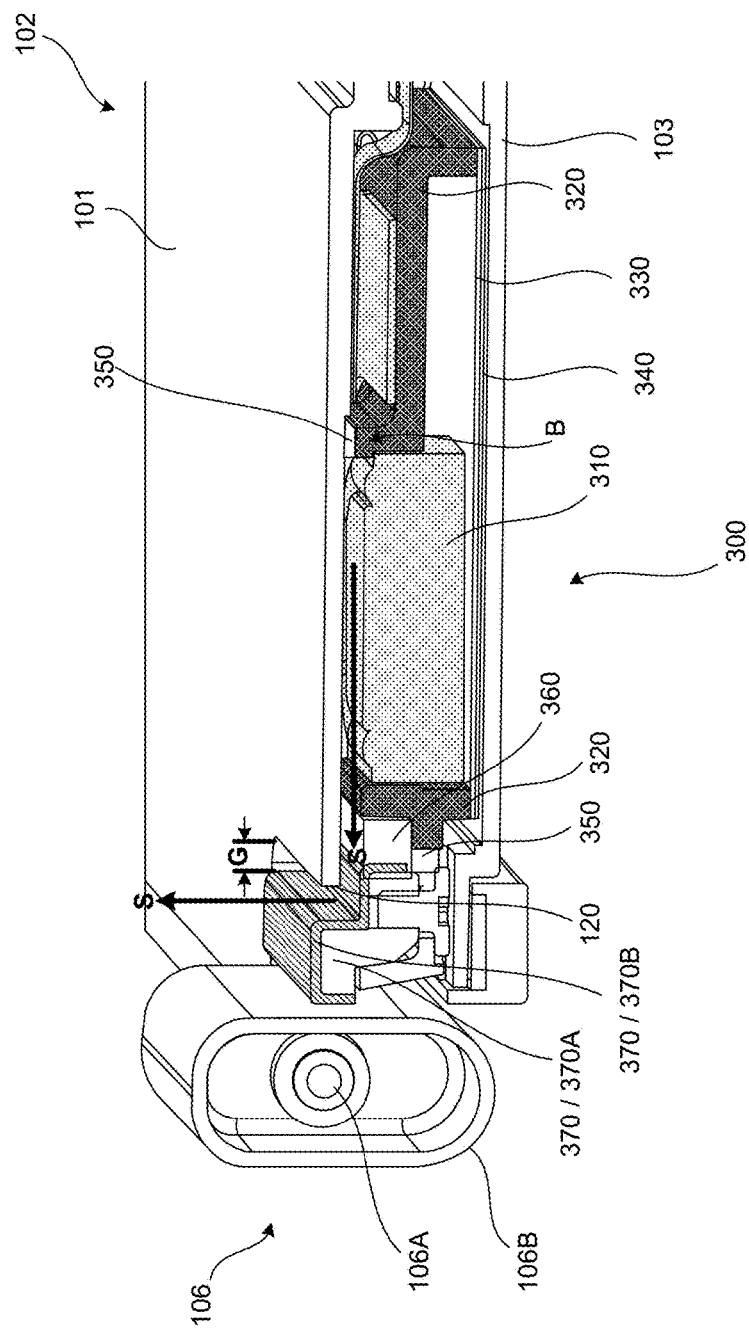
FIGS. 3B and 3D are partial cross-sectional views taken along line A-A of FIG. 3A, in a laptop mode or a closed mode of an example computing device, in accordance with implementations described herein.
Figure 3C:
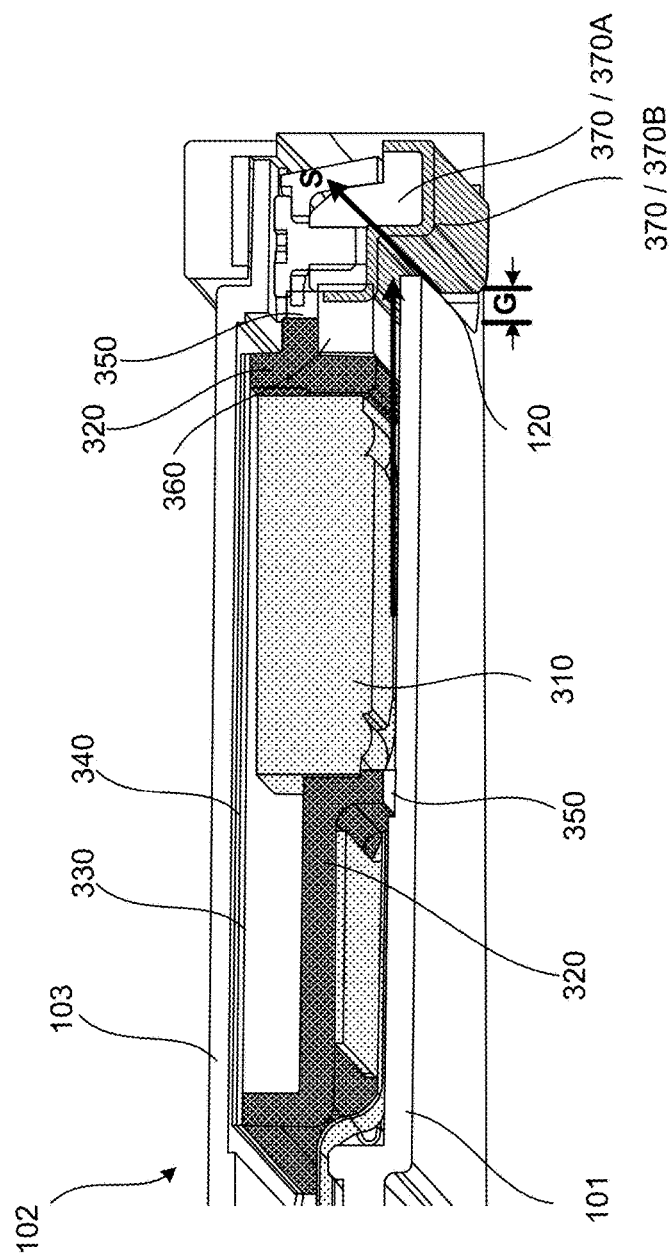
FIG. 3C is a partial cross-sectional view taken along line A-A of FIG. 3A, in a tablet mode of an example computing device, in accordance with implementations described herein.
Figure 3D:
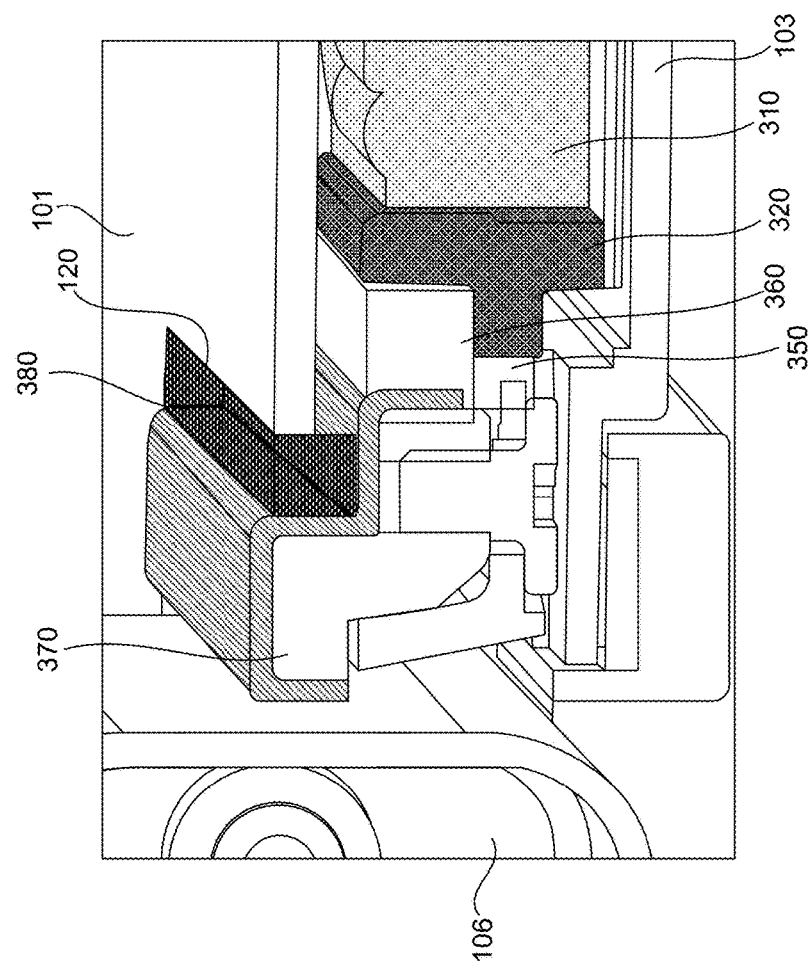
Figure 4A:
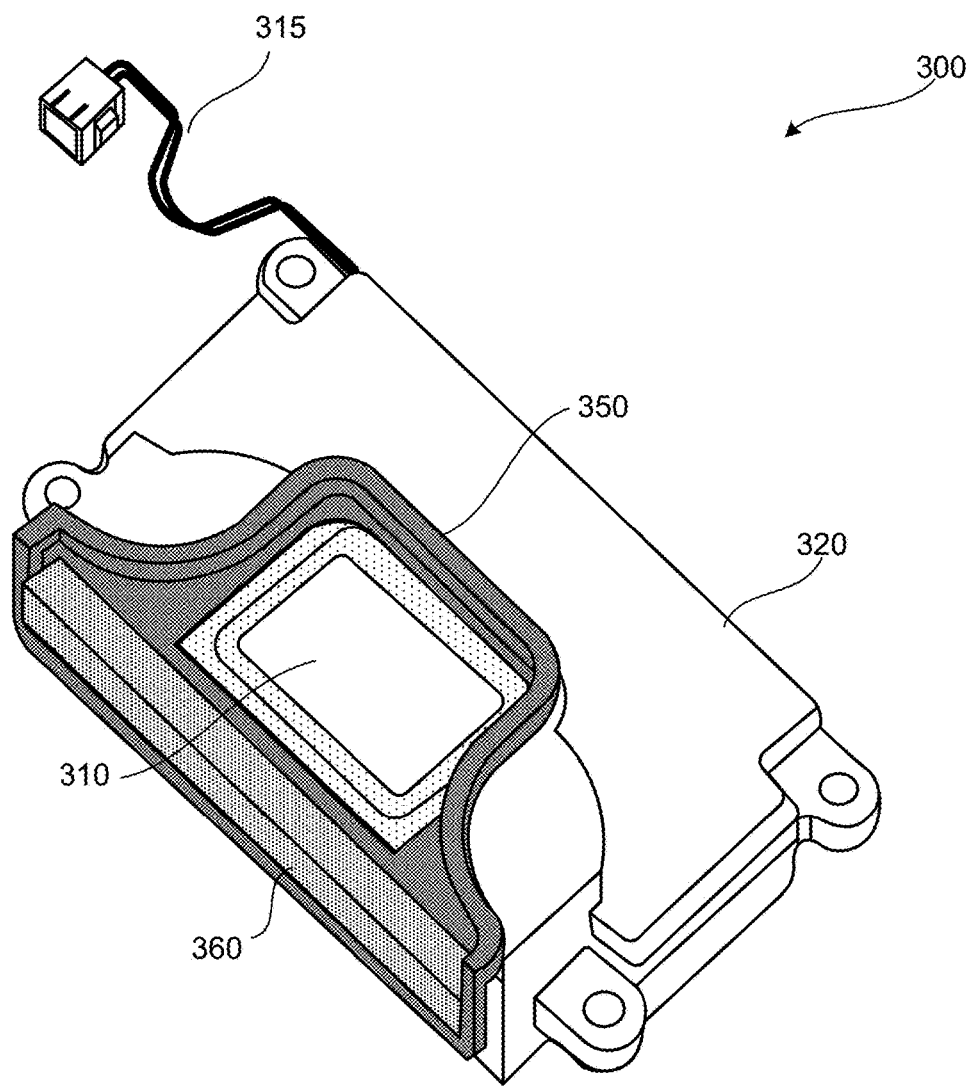
FIGS. 4A and 4C are perspective views.
Figure 4B:
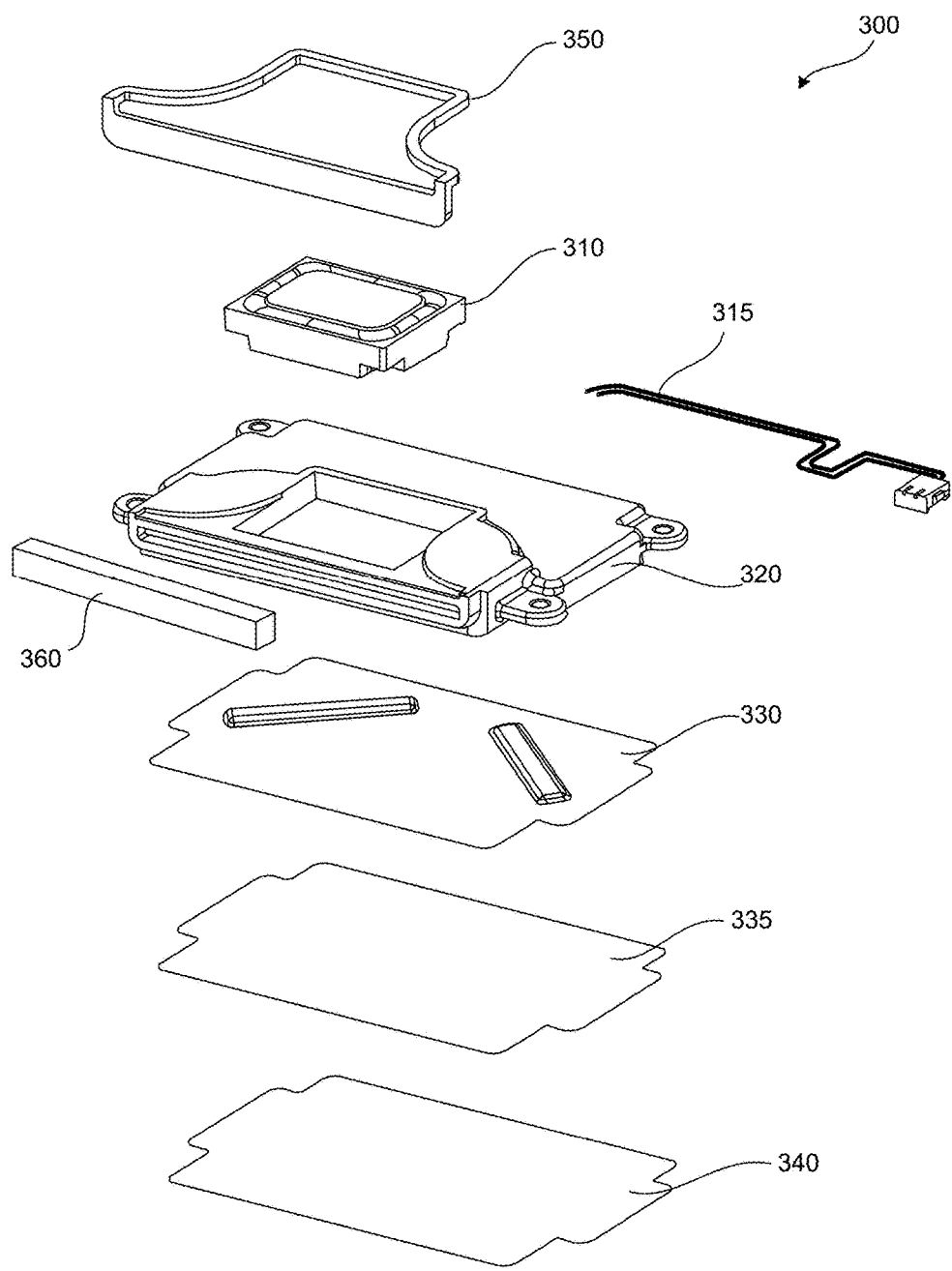
FIGS. 4B and 4D are exploded views, of example audio output devices of an example computing device, in accordance with implementations described herein.
Figure 4C:
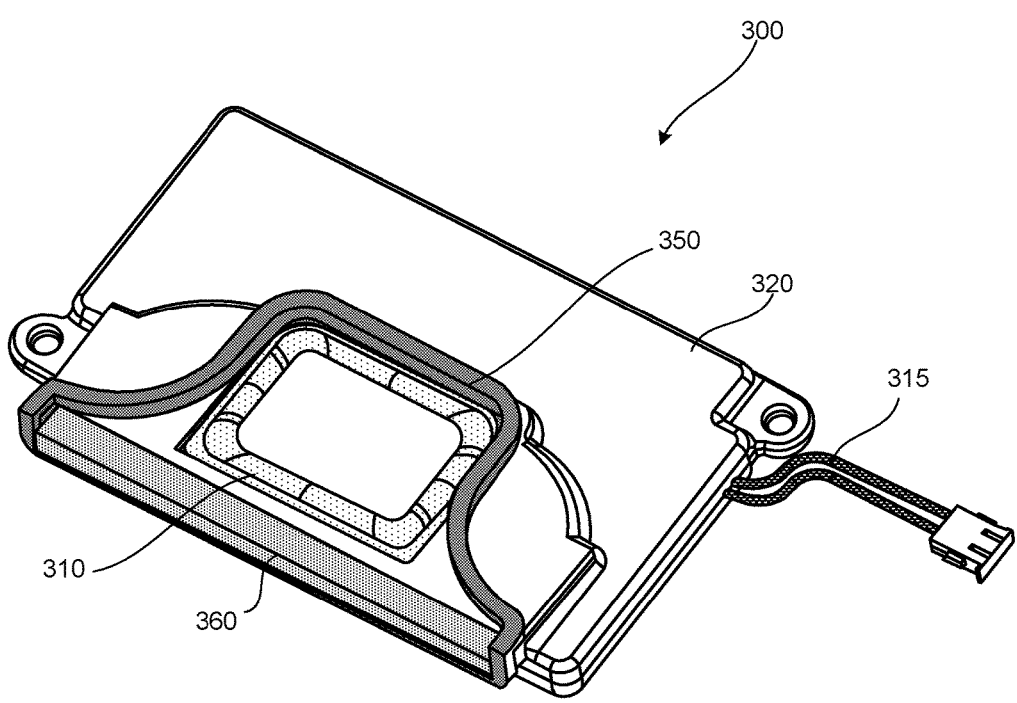
Figure 4D:
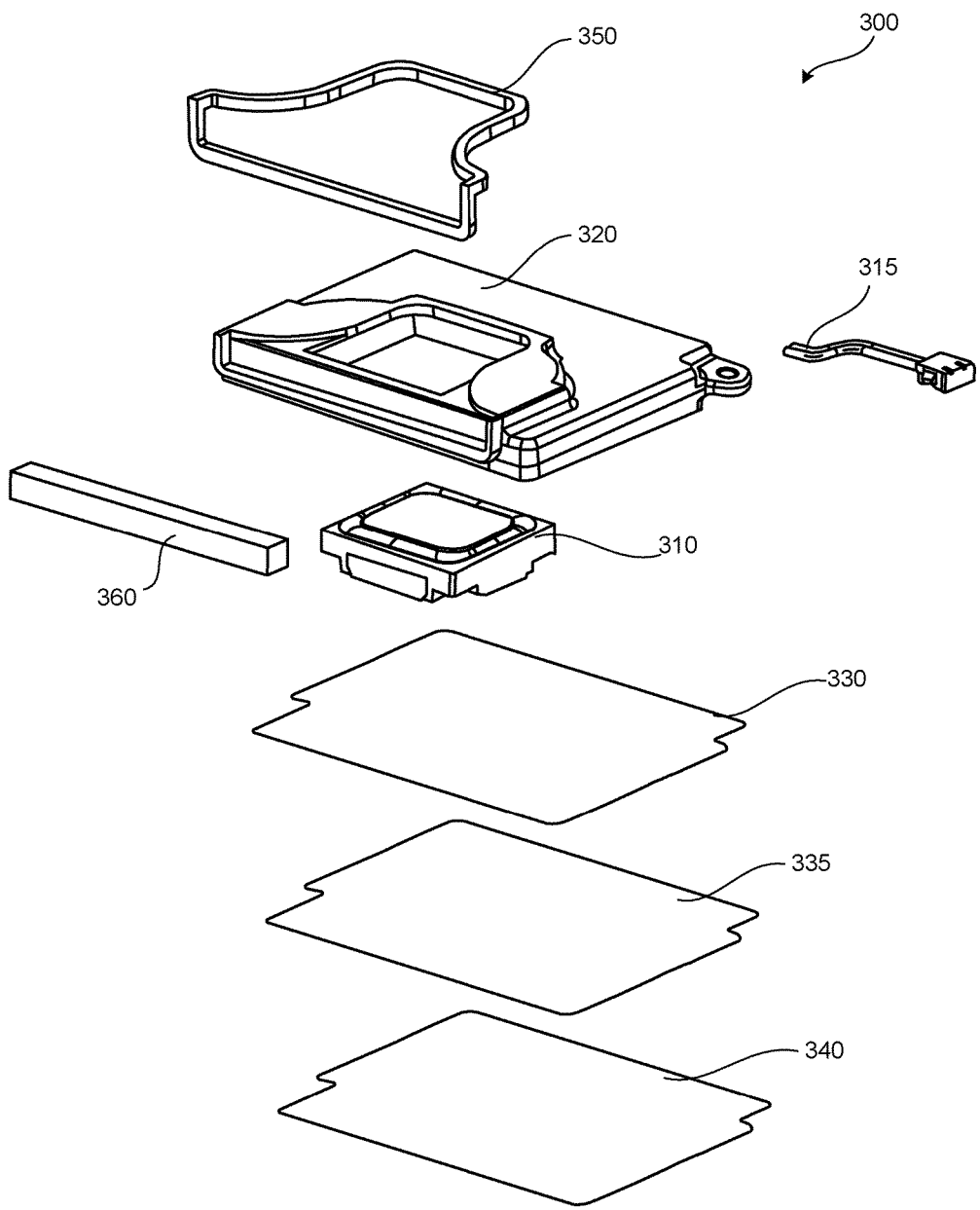

A partial top view of a portion the base housing 102 of the example computing device 100 including the example hinge assembly 106 and an example audio output device 300, or speaker 300, is shown in FIG. 3A. FIGS. 3B and 3D are partial cross-sectional views taken along line A-A of FIG. 3A, in the laptop mode or the closed mode of the computing device 100 shown in FIGS. 1A and 1B. FIG. 3C is a partial cross-sectional view taken along line A-A of FIG. 3A, in the tablet mode of the computing device 100 shown in FIG. 1C. FIG. 4A is a perspective view, and FIG. 4B is an exploded view, of an example implementation of the audio output device 300, or speaker 300, shown in FIGS. 3A and 3B. FIG. 4C is a perspective view, and FIG. 4D is an exploded view, of another example implementation of the audio output device 300, or speaker 300, shown in FIGS. 3A and 3B.

As shown in FIGS. 3A and 3B, a body portion of the hinge assembly 106 may be positioned in an opening 120, or port 120, defined in the base housing 102, for example, at a peripheral edge portion of the upper surface 101 of the base housing 102. The hinge assembly 106 may include, for example, at least one hinge shaft 106A received in at least one hinge housing 106B. In some implementations, the hinge shaft 106A may extend out through opposite ends of the hinge housing 106B and into the base housing 102 and/or into the display housing 104, allowing the hinge assembly 106 to rotatably couple the base housing 102 and the display housing 104.

In some implementations, the opposite ends of the hinge shaft 106A may be fixedly coupled to the base housing 102, and the display housing 104 may be fixedly coupled the hinge housing 106B, allowing the display housing 104 (and the hinge housing 106B) to rotate about the hinge shaft 106A, and the display housing 104 to rotate relative to the base housing 102. Other coupling arrangements of the hinge shaft 106A, the hinge housing 106B, the base housing 102 and the display housing 104 may also provide for relative rotation of the display housing 104 and the base housing 102.

In some implementations, the hinge assembly 106 may include a double barrel hinge structure, in which the hinge housing 106B may include, for example, a first barrel portion and first hinge shaft coupled to a first side of the opening 120 in the base housing 102, and a second barrel portion and second hinge shaft coupled to a first side of an opening in the display housing 104. In this type of double barrel hinge structure, the hinge housing may be rotatable relative to both the base housing 102 and the display housing 104, leaving a second side of the opening 120 in the base housing 102 and a second side of the opening in the display housing 104 available to route cables between the base housing 102 and the display housing 104.

In some implementations, the audio output device 300, or speaker 300, may be installed in the base housing 102. The audio output device 300 may include a driver 310 received in an enclosure bracket 320. A plate 330 may be positioned adjacent to the enclosure bracket 320, to enclose a corresponding end portion of the enclosure bracket 320, and to seal and/or define the back volume of the audio output device 300. An isolation pad 340 may be positioned at an outer surface of the plate 330, to absorb vibration generated during operation of the audio output device 300. In some implementations, the isolation pad 340 may be coupled to the plate 330 by, for example, a pressure sensitive adhesive layer 335, or other type of coupling mechanism. A connector 315 may connect the driver 310 to a processor/controller of the computing device 100 to control operation of the audio output device 300.

The top portion of the driver 310 and the top portion of the enclosure bracket 320 may positioned adjacent to the top surface 101 of the base housing 102. A seal 350 may be positioned on the enclosure bracket 320, for example, surrounding the driver 310, providing for a seal between the enclosure bracket 320 and the top surface 101 of the base housing 102 to define the front volume of the audio output device 300. With the top surface 101 of the base housing 102 bounding the front volume of the audio output device 300 in this manner, the need for an additional plate (similar to the plate 330) at the top of the audio output device 300 may be eliminated. This may allow overall stack height (for example, in a z direction in the example shown in FIGS. 3A-3D) of the audio output device 300 to be reduced for a driver 310 having a fixed height (for example, in the z direction) and a front volume having a fixed height (for example, in the z direction), thus allowing the thickness of the computing device 100 to be reduced, particularly in the area of the base housing 102 in which the audio output device 300 is installed.

A support pad 370 may be positioned in a portion of the opening 120 in the base housing 102, along an edge portion of the enclosure bracket 320 that borders the opening 120. A filler pad 360 may be positioned between an edge portion of the support pad 370 and a corresponding edge portion of the enclosure bracket 320, as shown in FIG. 3B to fill a gap between the support pad 370 and the enclosure bracket 320, and maintain a desired position of the audio output device 300 with respect to the opening 120 in the base housing 102 of the computing device 100. The sealing between the enclosure bracket 320 and the top surface 101 of the base housing 102 provided by the seal 350 (for example, at the area B shown in FIG. 3B) may define the front volume of the audio output device 300, directing sound generated by the driver 310 out through the opening 120, or audio output port 120, in the base housing 102 as shown by the arrows S in FIG. 3B. In some implementations, the support pad 370 and the filler pad 360 may be contoured, or shaped, so as to direct sound out through the opening 120, or audio output port 120, in the base housing 102, and toward the user.

When the computing device 100 is in the tablet mode shown in FIGS. 1C and 3C, the outer surface 107 of the display housing 104 may be positioned against the lower surface 103 of the base housing 102, with the display 112 received in the display housing 104 accessible to the user inputting and receiving information, and the upper surface 101 of the base housing 102, including the keypad 130 and the trackpad 132, facing away from the user. In some implementations, the support pad 370 may extend outward from the base housing 102, beyond a plane of the top surface 101 of the base housing 102, so that, when the computing device 100 is in the tablet mode, the support pad 370 may provide for support of the computing device 100 on a work surface such as, for example, a table or a desk. Extension of the support pad 370 outward, beyond the plane of the surface 101 of the base housing 102 in this manner may provide for a gap, or clearance, between the surface 101 of the base housing 102 and the work surface, allowing sound to propagate out through the opening 120, or audio output port 120, in the base housing 102 and be directed toward the user, in the direction of the arrows S, as shown in FIG. 3C. In some implementations, the support pad 370 may include a rigid portion 370A, made of a rigid material such as, for example, a metal material such as, for example aluminum, or another rigid material, that can provide support for the computing device 100 on the work surface. In some implementations, the support pad 370 may include a cover portion 370B attached to an outer surface of the rigid portion 370A. The cover portion 370B may be made of a material that provides traction to prevent slipping of the computing device 100 on the work surface when positioned in this manner, such as, for example, a silicone rubber material and the like. The cover portion 370B may be attached to the rigid portion 370A of the support pad 370 by, for example, an over-molding process, a chemical adhesion process, or other attachment mechanism.

In some implementations, the plate 330 may be made of a rigid material, such as, for example, a metal material such as, for example, stainless steel. In some implementations, the isolation pad 340 may be made of a relatively resilient material that can provide for shock absorption such as, for example, a foam material. In some implementations, the filler pad 360 may be made of a relatively resilient material that can be adapted to fit within a gap between the edge portion of the support pad 370 and the corresponding edge portion of the enclosure bracket 320, such as, for example, a foam material.

In some implementations, a gap G between the support pad 370 and a corresponding edge of the opening 120 in the base housing 102 may define a port through which sound generated by the audio output device 300 may be directed out of the base housing 102 and toward the user. In some implementations, the gap G may be, for example, less than or equal to approximately 1.0 mm. In some implementations, the gap G may be greater than approximately 1.0 mm. In some implementations, a mesh plate 380, or screen 380, or other type of cover, may be positioned across the gap G, as shown in FIG. 3D.

In a computing device including an audio output device, in accordance with implementations described herein, a front volume of the audio output device may be defined in part by an inner facing surface of a housing of the computing device, eliminating the need for a separate enclosure plate, and reducing an overall thickness of the audio output device. In some implementations, an audio output port may be defined by an opening in the housing, at a position corresponding to the audio output device, further reducing the overall thickness of the audio output device. A path from the audio output device to the audio output port may be defined in part by a support pad that may guide sound generated by the audio output device out through the audio output port in a direction toward the user, and may also function as a support pad supporting the computing device on a work surface when operating in a tablet mode. In some implementations, placement of an isolation pad adjacent to an enclosure plate enclosing a back volume of the audio output device may reduce or substantially eliminate rub and buzz at the back volume, thus improving sound quality output by the audio output device.

Figure 5:
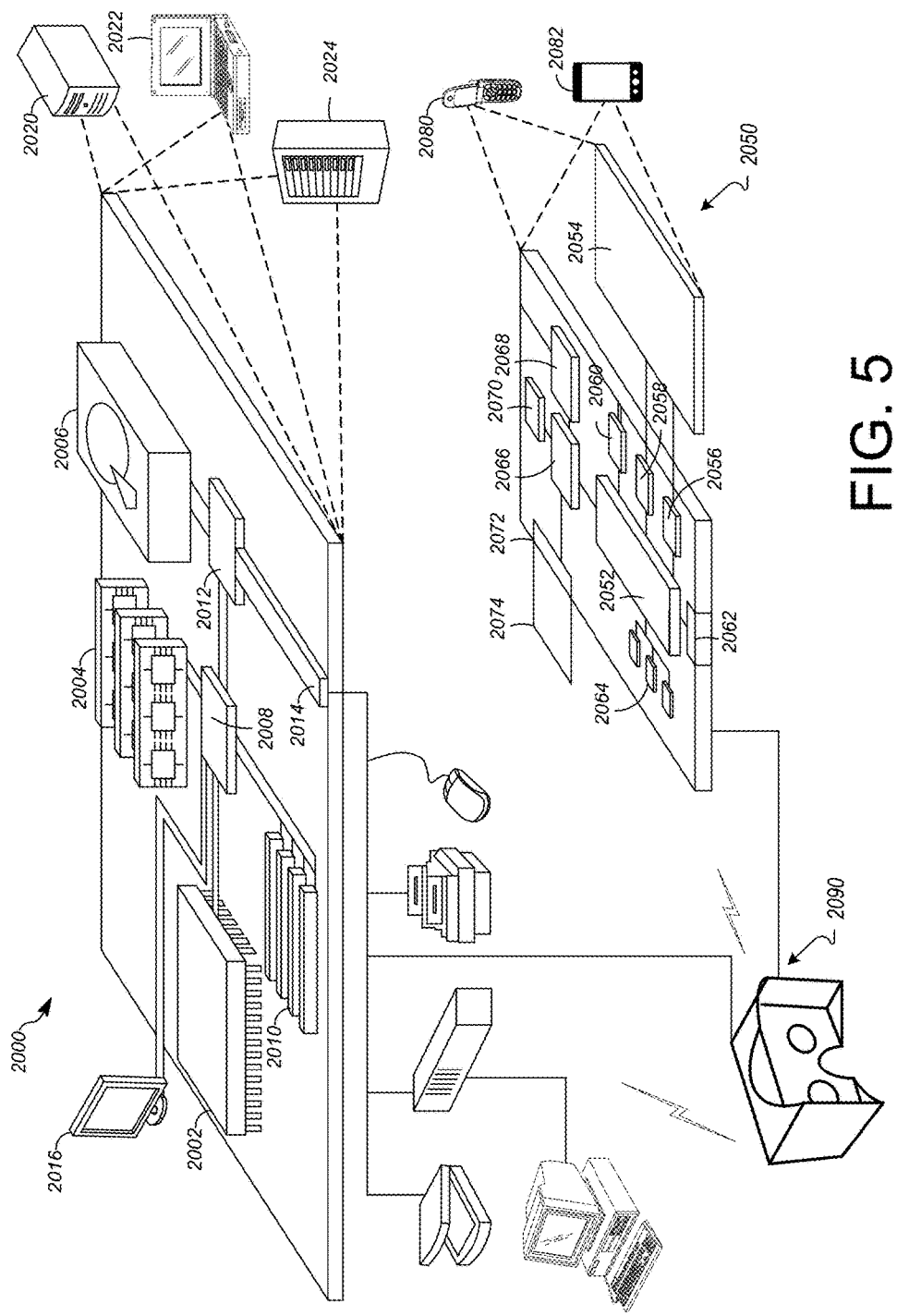
FIG. 5 illustrates example computing device(s) and mobile computing device(s) that can be used to implement the techniques described herein.

FIG. 5 shows an example of a computer device 2000 and a mobile computer device 2050, which may be used with the techniques described here. Computing device 2000 includes a processor 2002, memory 2004, a storage device 2006, a high-speed interface 2008 connecting to memory 2004 and high-speed expansion ports 2010, and a low speed interface 2012 connecting to low speed bus 2014 and storage device 2006. Each of the components 2002, 2004, 2006, 2008, 2010, and 2012, are interconnected using various busses, and may be mounted on a common motherboard or in other manners as appropriate. The processor 2002 can process instructions for execution within the computing device 2000, including instructions stored in the memory 2004 or on the storage device 2006 to display graphical information for a GUI on an external input/output device, such as display 2016 coupled to high speed interface 2008. In other implementations, multiple processors and/or multiple buses may be used, as appropriate, along with multiple memories and types of memory. Also, multiple computing devices 2000 may be connected, with each device providing portions of the necessary operations (e.g., as a server bank, a group of blade servers, or a multi-processor system).

The memory 2004 stores information within the computing device 2000. In one implementation, the memory 2004 is a volatile memory unit or units. In another implementation, the memory 2004 is a non-volatile memory unit or units. The memory 2004 may also be another form of computer-readable medium, such as a magnetic or optical disk.

The storage device 2006 is capable of providing mass storage for the computing device 2000. In one implementation, the storage device 2006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2004, the storage device 2006, or memory on processor 2002.

The high speed controller 2008 manages bandwidth-intensive operations for the computing device 2000, while the low speed controller 2012 manages lower bandwidth-intensive operations. Such allocation of functions is exemplary only. In one implementation, the high-speed controller 2008 is coupled to memory 2004, display 2016 (e.g., through a graphics processor or accelerator), and to high-speed expansion ports 2010, which may accept various expansion cards (not shown). In the implementation, low-speed controller 2012 is coupled to storage device 2006 and low-speed expansion port 2014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2000 may be implemented in a number of different forms, as shown in the figure. For example, it may be implemented as a standard server 2020, or multiple times in a group of such servers. It may also be implemented as part of a rack server system 2024. In addition, it may be implemented in a personal computer such as a laptop computer 2022. Alternatively, components from computing device 2000 may be combined with other components in a mobile device (not shown), such as device 2050. Each of such devices may contain one or more of computing device 2000, 2050, and an entire system may be made up of multiple computing devices 2000, 2050 communicating with each other.

Computing device 2050 includes a processor 2052, memory 2064, an input/output device such as a display 2054, a communication interface 2066, and a transceiver 2068, among other components. The device 2050 may also be provided with a storage device, such as a microdrive or other device, to provide additional storage. Each of the components 2050, 2052, 2064, 2054, 2066, and 2068, are interconnected using various buses, and several of the components may be mounted on a common motherboard or in other manners as appropriate.

The processor 2052 can execute instructions within the computing device 2050, including instructions stored in the memory 2064. The processor may be implemented as a chipset of chips that include separate and multiple analog and digital processors. The processor may provide, for example, for coordination of the other components of the device 2050, such as control of user interfaces, applications run by device 2050, and wireless communication by device 2050.

Processor 2052 may communicate with a user through control interface 2058 and display interface 2056 coupled to a display 2054. The display 2054 may be, for example, a TFT LCD (Thin-Film-Transistor Liquid Crystal Display) or an OLED (Organic Light Emitting Diode) display, or other appropriate display technology. The display interface 2056 may comprise appropriate circuitry for driving the display 2054 to present graphical and other information to a user. The control interface 2058 may receive commands from a user and convert them for submission to the processor 2052. In addition, an external interface 2062 may be provided in communication with processor 2052, so as to enable near area communication of device 2050 with other devices. External interface 2062 may provide, for example, for wired communication in some implementations, or for wireless communication in other implementations, and multiple interfaces may also be used.

The memory 2064 stores information within the computing device 2050. The memory 2064 can be implemented as one or more of a computer-readable medium or media, a volatile memory unit or units, or a non-volatile memory unit or units. Expansion memory 2074 may also be provided and connected to device 2050 through expansion interface 2072, which may include, for example, a SIMM (Single In Line Memory Module) card interface. Such expansion memory 2074 may provide extra storage space for device 2050, or may also store applications or other information for device 2050. Specifically, expansion memory 2074 may include instructions to carry out or supplement the processes described above, and may include secure information also. Thus, for example, expansion memory 2074 may be provided as a security module for device 2050, and may be programmed with instructions that permit secure use of device 2050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2064, expansion memory 2074, or memory on processor 2052, that may be received, for example, over transceiver 2068 or external interface 2062.

Device 2050 may communicate wirelessly through communication interface 2066, which may include digital signal processing circuitry where necessary. Communication interface 2066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 2068. In addition, short-range communication may occur, such as using a Bluetooth, Wi-Fi, or other such transceiver (not shown). In addition, GPS (Global Positioning System) receiver module 2070 may provide additional navigation- and location-related wireless data to device 2050, which may be used as appropriate by applications running on device 2050.

Device 2050 may also communicate audibly using audio codec 2060, which may receive spoken information from a user and convert it to usable digital information. Audio codec 2060 may likewise generate audible sound for a user, such as through a speaker, e.g., in a handset of device 2050. Such sound may include sound from voice telephone calls, may include recorded sound (e.g., voice messages, music files, etc.) and may also include sound generated by applications operating on device 2050.

The computing device 2050 may be implemented in a number of different forms, as shown in the figure. For example, it may be implemented as a cellular telephone 2080. It may also be implemented as part of a smart phone 2082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 5 can include sensors that interface with a virtual reality (VR headset/HMD device 2090). For example, one or more sensors included on a computing device 2050 or other computing device depicted in FIG. 5, can provide input to VR headset 2090 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 2050 can use the sensors to determine an absolute position and/or a detected rotation of the computing device in the VR space that can then be used as input to the VR space. For example, the computing device 2050 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 2050 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 2050 when the computing device is incorporated into the VR space can cause a particular action to occur in the VR space.

In some implementations, a touchscreen of the computing device 2050 can be rendered as a touchpad in VR space. A user can interact with the touchscreen of the computing device 2050. The interactions are rendered, in VR headset 2090 for example, as movements on the rendered touchpad in the VR space. The rendered movements can control virtual objects in the VR space.

In some implementations, one or more output devices included on the computing device 2050 can provide output and/or feedback to a user of the VR headset 2090 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 2050 may appear as another object in a computer-generated, 3D environment. Interactions by the user with the computing device 2050 (e.g., rotating, shaking, touching a touchscreen, swiping a finger across a touch screen) can be interpreted as interactions with the object in the VR space. In the example of the laser pointer in a VR space, the computing device 2050 appears as a virtual laser pointer in the computer-generated, 3D environment. As the user manipulates the computing device 2050, the user in the VR space sees movement of the laser pointer. The user receives feedback from interactions with the computing device 2050 in the VR environment on the computing device 2050 or on the VR headset 2090.

In some implementations, a computing device 2050 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard)

can be rendered in a computer-generated, 3D environment. The rendered input devices (e.g., the rendered mouse, the rendered keyboard) can be used as rendered in the VR space to control objects in the VR space.

Computing device 2000 is intended to represent various forms of digital computers and devices, including, but not limited to laptops, desktops, workstations, personal digital assistants, servers, blade servers, mainframes, and other appropriate computers. Computing device 2050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computing device, comprising:
    a base housing;
    a display housing coupled to the base housing by a hinge assembly, wherein the display housing is rotatable about the hinge assembly relative to the base housing through a range of rotation greater than 350 degrees;
    an audio output device installed in the base housing;
    an opening formed in the base housing, a first portion of the opening defining an audio output port, and the hinge assembly being coupled to the base housing at a second portion of the opening;
    a support pad positioned in the opening, between the hinge assembly and a first edge portion of the opening; and
    a gap formed between the support pad and the first edge portion of the opening, the gap corresponding to the first portion of the opening, defining the audio output port,
    wherein the computing device is operable
        in a first mode in which a first surface of the base housing is separated from a first surface of the display housing by a viewing angle set by a user, and
        in a second mode in which in which a second surface of the base housing, opposite the first surface of the base housing, is positioned against a second surface of the display housing.

2. The device of claim 1, wherein
    the base housing includes at least one user input device at the first surface, and
    the first surface of the display housing includes a display, and a bezel surface surrounding the display, with a second surface of the display housing, opposite the first surface of the display housing, defining an outer surface of the display housing opposite the bezel surface, and
    wherein the opening is formed in a peripheral edge portion of the first surface of the base housing, at a position corresponding to a position of the audio output device in the base housing.

3. The device of claim 1, the audio output device including:
    an enclosure bracket;
    an audio driver coupled to the enclosure bracket;
    a seal positioned between a first side of the enclosure bracket and the first surface of the base housing, the first side of the enclosure bracket, the first surface of the base housing, and the seal defining a front volume of the audio output device;
    an enclosure plate positioned at a second side of the enclosure bracket, the enclosure plate and the second side of the enclosure bracket defining a back volume of the audio output device; and
    an isolation pad positioned between the second side of the enclosure plate and the second surface of the base housing.

4. The device of claim 3, wherein the support pad protrudes outward from the opening beyond a plane of the first surface of the base housing.

5. The device of claim 4, wherein the gap is in communication with the front volume of the audio output device defined by the first side of the enclosure bracket, the first surface of the base housing, and the seal, such that sound generated by the audio output device in the front volume is directed out of the computing device through the gap defining the audio output port.

6. The device of claim 3, wherein
    the gap corresponding to the first portion of the opening, defining the audio output port, is formed between the support pad and a first longitudinal edge portion of the opening, and
    the hinge assembly is coupled to the base housing between the support pad and a second longitudinal edge portion of the opening, opposite the first longitudinal edge portion of the opening.

7. The device of claim 6, wherein
the first mode is a laptop mode in which the first surface of the base housing is separated from the bezel surface of the display housing by a viewing angle set by a user, and
the second mode is a tablet mode in which the second surface of the base housing is positioned directly against the outer surface of the display housing.

8. The device of claim 7, wherein the support pad protrudes outward from the opening, beyond a plane of the first surface of the base housing, such that, in the tablet mode, the computing device is configured to be supported on a work surface by the support pad, with a space formed between the first surface of the base housing and the work surface, with sound generated by the audio output device being directed out through the first portion of the opening defining the audio output port, and toward peripheral edge portions of the base housing through the space between the first surface of the base housing and the work surface.

9. The device of claim 8, the support pad including:
a rigid portion made of an aluminum material; and
a cover portion made of a silicone rubber material, the cover portion being chemically adhered to an outer surface of the rigid portion.

10. The device of claim 1, wherein the hinge assembly includes:
at least one hinge housing coupled to at least one of the base housing or the display housing; and
at least one hinge shaft extending through the at least one hinge housing the at least one of the base housing or the display housing.

11. A computing device, comprising:
a base housing including a first surface and a second surface opposite the first surface;
at least one user interface device included on the base housing;
an opening formed in a peripheral edge portion of the first surface of the base housing, the opening defining an audio output port;
a support pad positioned in the opening, the support pad including:
a rigid portion; and
a cover portion adhered to an outer surface of the rigid portion; and
an audio output device installed in the base housing, at a position corresponding to the opening in the base housing, the audio output device including:
an enclosure bracket;
an audio driver coupled to the enclosure bracket;
a seal positioned between a first side of the enclosure bracket and the first surface of the base housing, the first side of the enclosure bracket, the first surface of the base housing, and the seal defining a front volume of the audio output device;
an enclosure plate positioned at a second side of the enclosure bracket, the enclosure plate and the second side of the enclosure bracket defining a back volume of the audio output device; and
an isolation pad positioned between the second side of the enclosure plate and the second surface of the base housing.

12. The device of claim 11, further comprising a display housing rotatably coupled to the base housing by a hinge assembly, the display housing including:
an outer surface;
a bezel surface opposite the outer surface; and
a display device positioned in an opening in the bezel surface.

13. The device of claim 12, wherein the hinge assembly is coupled to the base housing at an outer edge portion of the opening formed in the peripheral edge portion of the base housing, the device further comprising:
a gap formed between the support pad and an inner edge portion of the opening, the gap defining the audio output port.

14. The device of claim 13, wherein the gap is in communication with the front volume of the audio output device defined by the first side of the enclosure bracket, the first surface of the base housing, and the seal, such that sound generated by the audio output device in the front volume is directed out of the computing device through the gap defining the audio output port.

15. The device of claim 13, wherein the support pad protrudes outward from the opening, beyond a plane of the first surface of the base housing.

16. The device of claim 15, wherein, in a tablet mode,
the second surface of the base housing is positioned directly against the outer surface of the display housing, and
the support pad is configured to support the computing device on a work surface, and
wherein sound generated by the audio output device is directed out through the audio output port, and toward a user through a space formed between the first surface of the base housing and the work surface.

17. The device of claim 13, wherein the rigid portion of the support pad is made of an aluminum material, and the cover portion of the support pad is made of a silicone rubber material, the cover portion being chemically adhered to an outer surface of the rigid portion.

18. The device of claim 12, wherein the hinge assembly is one of a plurality of hinge assemblies rotatably coupling the display housing to the base housing, and the opening in the base housing is one of a plurality of openings in the base housing, the plurality of openings corresponding to the plurality of hinge assemblies.

19. The device of claim 12, wherein the hinge assembly includes:
a hinge housing; and
a first hinge shaft extending between the hinge housing and the base housing; and
a second hinge shaft extending between the hinge housing and the display housing, wherein the hinge housing is selectively rotatable about the first hinge shaft and the second hinge shaft.

20. The device of claim 11, the at least one user interface including at least one of a keyboard, a trackpad, or a touchscreen display device.

21. The device of claim 1, wherein, in the second mode, sound generated by the audio output device is directed through the audio output port, and toward peripheral edge portions of the base housing through a space between the first surface of the base housing and a work surface on which the computing device is positioned.

* * * * *